United States Patent [19]

Bouhier

[11] Patent Number: 5,251,884
[45] Date of Patent: Oct. 12, 1993

[54] HYDRAULIC ANTIVIBRATION MOUNTS FOR DAMPING OSCILLATIONS IN RIGID PARTS

[75] Inventor: Bernard Bouhier, Vierzon, France
[73] Assignee: Hutchinson, France
[21] Appl. No.: 865,220
[22] Filed: Apr. 8, 1992

[30] Foreign Application Priority Data

Apr. 23, 1991 [FR] France ................. 91 04998

[51] Int. Cl.⁵ ............................................ F16F 13/00
[52] U.S. Cl. ............................. 267/140.12; 267/219
[58] Field of Search ............. 267/140.11, 140.12, 267/140.13, 219, 220, 35; 248/550, 562, 636

[56] References Cited

U.S. PATENT DOCUMENTS

| | | | |
|---|---|---|---|
| 4,605,207 | 8/1986 | Konishi | 267/140.12 |
| 4,768,760 | 9/1988 | LeFol | 267/140.12 |
| 4,771,990 | 9/1988 | Domer et al. | 267/140.12 |
| 4,869,475 | 9/1989 | Bouhier | 267/140.12 |

FOREIGN PATENT DOCUMENTS 8203242 11/1983 Japan ................. 267/140.12

*Primary Examiner*—Matthew C. Graham
*Attorney, Agent, or Firm*—Larson and Taylor

[57] ABSTRACT

A hydraulic antivibration mount comprises two rigid tubular endpieces (1, 2) one surrounding the other, the endpieces being connected together by an elastomer body (3) shaped so as to form together therewith two diametrically opposite liquid-tight pockets (A, B) that communicate with each other via a narrow channel (7), said pockets and said channel being filled with a damping liquid, the narrow channel (7) being delimited on the outside by the inside cylindrical face (10) of the central portion of the inner tubular endpiece (1) and being delimited on the inside by a groove (8) formed in the outer cylindrical face of a ring (9). The inner tubular endpiece is shaped so as to present both an axial inlet (13) that is large enough to provide access to the ring (9) and a cylindrical housing (10) at the end of said inlet and suitable for receiving said ring as a force-fit.

7 Claims, 1 Drawing Sheet

HYDRAULIC ANTIVIBRATION MOUNTS FOR DAMPING OSCILLATIONS IN RIGID PARTS

The invention relates to hydraulic antivibration mounts comprising two rigid tubular endpieces, one surrounding the other, and preferably circularly symmetrical, at least in part, about a Z-axis, coaxial and concentric at least under load, the endpieces being connected together by an elastomer body shaped so as to form together therewith at least two liquid-tight pockets that are diametrically opposite along an X-direction and that communicate with each other via a narrow channel, said pockets and said channel being filled with a damping liquid.

Such mounts are designed for the purposes of connecting together (or of supporting per se) two rigid parts suitable for being connected to respective ones of the two endpieces, and for the purpose of damping oscillations of one of the parts relative to the other along the diametral X-direction. The assembly is organized in such a manner that for at least some of such oscillations, the liquid is urged to alternate from one of the pockets to the other and back again via the narrow channel, thereby establishing a resonance phenomenon in the liquid at a given oscillation frequency that depends on the dimensions of said channel, which phenomenon is suitable for damping the transmission of said oscillations from one of the endpieces to the other.

Mounts of the kind in question are intended, for example, to be interposed between the body or the chassis of a vehicle and an internal combustion engine or a front or rear axle assembly of the vehicle.

More particularly, the invention relates to mounts of the above kind in which the narrow channel is delimited on the outside by the inside cylindrical face of the central portion of the inner tubular endpiece and on the inside by a groove hollowed out in the cylindrical outside face of a ring received in and making contact with said central portion, said groove interconnecting two radial openings formed through said endpiece (see FIGS. 7 to 9 of U.S. Pat. No. 4,771,990 to Domer et al, for example).

In presently known embodiments of mounts of the kind in question, the narrow channel is made at the same time as the mount itself and it is subsequently terminated by the operation of molding the elastomer body: the ring in which the groove defining the narrow channel is hollowed out is then generally embedded, at least in part, in a mass of elastomer integrally molded with said body, and it is therefore not accessible from outside the mount after said molding has taken place.

Such a solution is appropriate for mass production when the dimensions to be given to the narrow channel are known accurately in advance.

However it is not appropriate for short runs or for prototypes, under which circumstances it is desirable to be able to modify the dimensions of the narrow channel easily as a function of requirements.

A particular object of the invention is to make mounts of the kind in question so that they lend themselves easily to such modifications.

To this end, according to the invention, hydraulic antivibration mounts of the kind specified are essentially characterized in that their inner tubular endpiece is shaped so as to present firstly an axial inlet that is large enough to provide access for the ring, which access remains available even after the elastomer body has been molded, and so as to present secondly, at the end of said inlet, a cylindrical housing suitable for receiving said ring and for making contact therewith by means of a force-fit.

The ring can then be installed by said force-fit from the outside of the mount, even after the mount's elastomer body adhering to both endpieces has been formed.

To provide the necessary liquid-tight sealing between the inside of the narrow channel and the outside of the mount, it is advantageous to implement one and/or the other of the following two features:

the inside cylindrical face of the housing for receiving and for making contact with the ring is lined with a layer of elastomer material, which material is preferably integrally molded with the elastomer body connecting the two endpieces together; and the ring is itself made of a flexible material, in particular an elastomer, and it is preferably reinforced by rigid cylindrical reinforcement embedded in said material.

In addition to these main features, the invention includes other dispositions which are preferably used together therewith and which are described in greater detail below.

BRIEF DESCRIPTION OF DRAWINGS

Embodiments of the invention are described below in nonlimiting manner and with reference to the accompanying drawing.

DETAILED DESCRIPTION OF DRAWINGS

Figure 1:
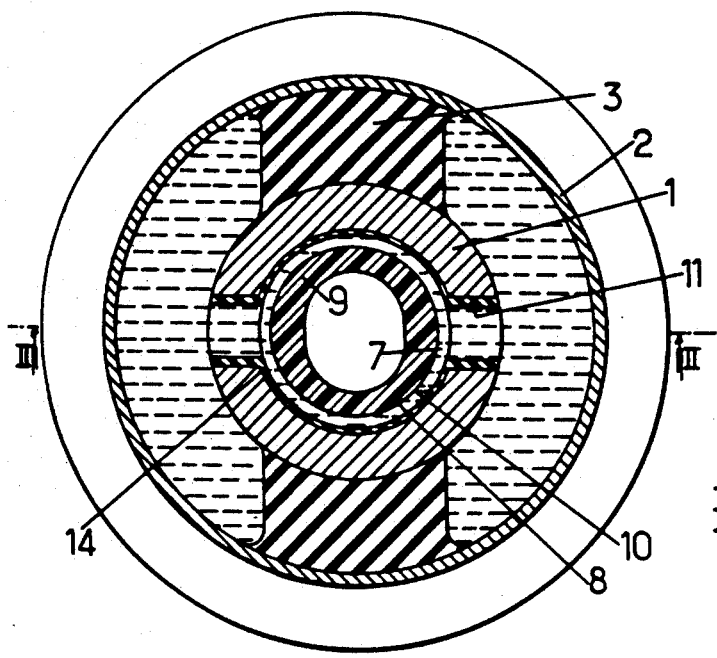
FIGS. 1 and 2 of the drawing show a hydraulic antivibration mount made according to the invention and shown respectively in cross-section on I—I of FIG. 2 and in axial section on II—II of FIG. 1.

In each case the mount comprises: a circularly symmetrical inner tubular metal endpiece 1; a circularly symmetrical outer tubular metal endpiece 2 which surrounds the endpiece 1 and, when the mount is at rest, is coaxial with the endpiece 1, with the axis Z common to both endpieces extending vertically; and an elastomer body 3 connecting the two endpieces 1 and 2 together and forming adjacent thereto two liquid-tight pockets A and B that are diametrically opposite in a horizontal direction X.

The inner endpiece 1 is intended, for example, to be secured to a plate 4 forming part of a vehicle suspension, with the plate bearing against an axial end of said endpiece, and with the plate being secured thereto by means of a bolt 5 passing in contact through the endpiece, and then through the plate, with a nut 6 being screwed onto the end of the bolt.

The outer endpiece 2 is then designed to be secured in a cylindrical housing or bearing (not shown) forming a part of the chassis of said vehicle.

The two pockets A and B are connected together by a narrow channel 7 and the two pockets and the channel are filled with a damping liquid.

The present invention relates essentially to the way in which the channel 7 is made.

In this case, the channel is delimited on the inside by a groove 8 extending around an arc of a circle and which is hollowed out in the outside cylindrical face of a ring 9, and on the outside it is delimited by the inside cylindrical face 10 of a central length of the inner endpiece 1.

The face 10 has two openings 11 formed radially in the X-direction and opening out into respective ones of the pockets A and B.

The face 10 is practically complementary to the outer cylindrical face of the ring 9 such that the ring 9 is housed in and makes contact with the face 10 by being a force-fit therein.

Said face 10 is extended at one of its two axial ends by an inside transverse shoulder 12 forming an axial abutment for the ring 9, and at its other axial end, it is extended by a cylindrical recess 13 that opens to the outside of the tubular endpiece 1 and that is suitable for allowing the ring 9 to pass therethrough.

As a result, the ring 9 can be installed at any time inside the endpiece 1 from outside the mount.

In particular, prior to installing the ring 9 inside the endpiece 1, it is possible to assemble the elastomer body 3 on the two endpieces 1 and 2 (in particular by molding the body 3 onto the endpiece 1 and onto an intermediate endpiece 2' having openings which is in turn force-fitted inside the endpiece 2).

The liquid tightness that needs to be achieved between the ring and the endpiece to prevent any of the liquid contained in the narrow channel 7 leaking to the outside of the mount is advantageously achieved in either of the two techniques described below.

Figure 2:
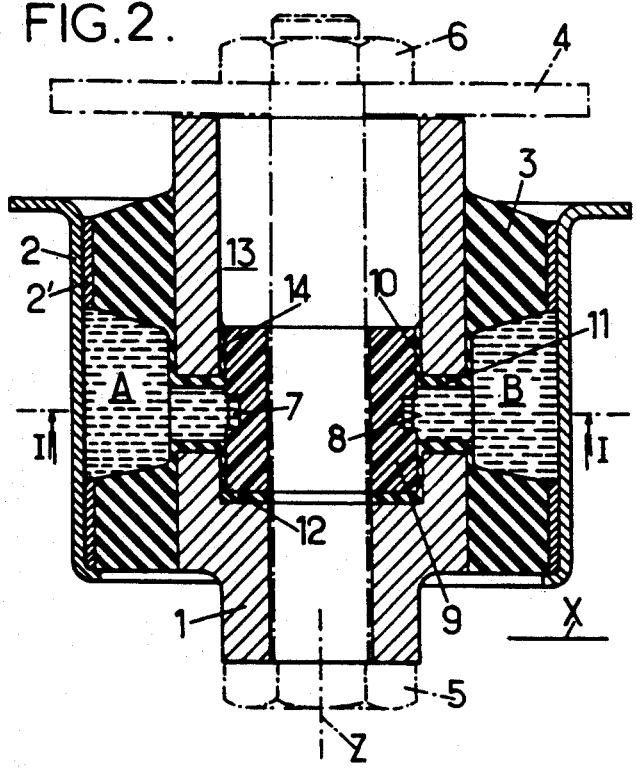

In a first technique, shown in FIGS. 1 and 2, and particularly suitable when the ring 9 is made of a rigid material such as a polyamide or other plastic, the inside cylindrical face 10 of the inner tubular endpiece 1 is lined With a flexible layer 14 which is advantageously integrally molded with the body 3.

This layer is compressed radially between the ring 9 and the face 10 when the ring is installed as an axial force-fit inside the face 10, with the layer then constituting a sealing ring.

Figure 3:
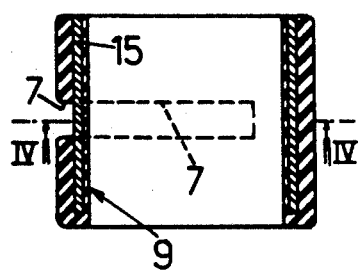
FIGS. 3 and 4 show a variant central ring, likewise in accordance with the invention, and included in the above device, the ring being shown respectively in axial section on III—III of FIG. 4 and in cross-section on IV—IV of FIG. 3.
Figure 4:
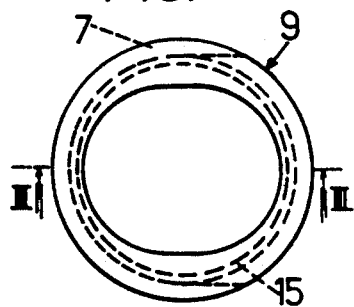

In a second technique illustrated in FIGS. 3 and 4, the ring 9 is itself made of a material that is sufficiently flexible, e.g. an elastomer: under such circumstances, it is direct contact between the ring 9 and the face 10 that provides the desired sealing, for which purpose it is advantageous for the ring to be slightly too large radially.

Under such circumstances, said ring is advantageously reinforced by an internal rigid cylindrical reinforcement 15 which is embedded therein.

As a result, whichever embodiment is used, a hydraulic antivibration mount is obtained whose constitution can clearly be seen from the above.

It will readily be understood that with such a sleeve, it is possible to mount the ring 9 at the very end of manufacture, i.e. after the body 3 has been molded, vulcanized and installed in adhesive contact on the two endpieces 1 and 2.

The ring 9 is installed in the mount merely by force-fitting the ring inside the endpiece 1 through its recess 13, and the desired sealing is automatically obtained merely by the force-fit, which also serves to lock the ring axially in its final position because of the friction established by the compression of the resilient portions.

It is therefore possible to install different rings 9 in the same mount, with the rings having grooves 8 that may be of dimensions that are very different (in section and in length), thereby making it possible to adjust very easily the frequency at which oscillations are damped best by the mount in question to requirements in each case.

Where appropriate, the solution described even makes it possible to replace a ring 9 by another ring, thereby changing the dimensions of the narrow channel 7 and thus changing the corresponding resonance frequency.

Naturally, as can be seen from the above, the invention is not limited in any way to the applications and embodiments described in detail. On the contrary, the invention extends to any variants thereof.

I claim:

1. A hydraulic antivibration mount comprising two rigid tubular endpieces, one surrounding the other, the endpieces being connected together by an elastomer body shaped so as to form together therewith at least two diametrically opposite liquid-tight pockets (A, B) that communicate with each other via a narrow channel, said pockets and said channel being filled with a damping liquid, the narrow channel being delimited on the outside by the inside cylindrical face of the central portion of the inner tubular endpiece and being delimited on the inside by a groove formed in the outer cylindrical face of a ring received in and making contact with said central portion, said groove interconnecting two radial openings formed through said inner tubular endpiece, said inner tubular endpiece having an axial inlet to enable insertion, removal and replacement of said ring even after the elastomer body has been molded and having a cylindrical housing therein for making contact with said outer cylindrical face of said ring by means of a force-fit.

2. An antivibration mount according to claim 1, wherein the end of the cylindrical housing is delimited by an inwardly directed transverse annular bearing surface constituting an axial abutment for the ring.

3. An antivibration mount according to claim 1, wherein the inside cylindrical face of the housing for receiving and for making contact with the ring is lined with a layer of elastomer material.

4. An antivibration mount according to claim 3 wherein the elastomer material is integrally molded with the elastomer body connecting the two outer tubular endpieces together.

5. An antivibration mount according to claim 1, wherein the ring is itself made of a flexible material.

6. An antivibration mount according to claim 5 wherein the flexible material is an elastomer.

7. An antivibration mount according to claim 5, wherein the ring is reinforced by rigid cylindrical reinforcement embedded in this flexible material.

* * * * *